(12) United States Patent
Blank (10) Patent No.: US 6,588,658 B1
(45) Date of Patent: Jul. 8, 2003

(54) TRANSACTION CARD WITH ATTACHED AUXILIARY MEMBER

(76) Inventor: Eric Blank, 492 Beacon St., Apt. 41, Boston, MA (US) 02115

( * ) Notice: Subject to any disclaimer, the term of this patent is extended or adjusted under 35 U.S.C. 154(b) by 91 days.

(21) Appl. No.: 09/602,223

(22) Filed: Jun. 23, 2000

(51) Int. Cl.[7] .................................................. G06K 5/00
(52) U.S. Cl. ...................... 235/380; 235/379; 235/382; 235/383; 235/487
(58) Field of Search ................................. 235/379, 380, 235/494, 382, 383; 283/61, 70, 81, 82

(56) References Cited

U.S. PATENT DOCUMENTS

| | | |
|---|---|---|
| 2,434,545 A | 1/1948 | Brady, Jr et al. |
| 2,831,277 A | 4/1958 | Strachan |
| 3,038,597 A | 6/1962 | Brady, Jr. |
| 3,226,862 A | 1/1966 | Gabruk |
| 3,568,829 A | 3/1971 | Brady, Jr. |
| 3,583,317 A | 6/1971 | Gibson |
| 3,622,995 A | 11/1971 | Dilks et al. |
| 3,632,995 A | 1/1972 | Wilson |
| 3,808,718 A | 5/1974 | Christiansen |
| 3,822,492 A | 7/1974 | Crawley |
| 3,896,246 A | 7/1975 | Brady, Jr. |
| 3,914,483 A | 10/1975 | Stipek, Jr. |
| 3,965,598 A | 6/1976 | Avery |
| 4,060,168 A | 11/1977 | Romagnoli |
| 4,066,873 A | 1/1978 | Schatz |
| 4,126,333 A | 11/1978 | Dickinson |
| 4,272,327 A | 6/1981 | Logan |
| 4,359,633 A | 11/1982 | Bianco |
| 4,372,681 A | 2/1983 | Sallenbach |
| RE31,211 E | 4/1983 | Whitehead |
| 4,379,573 A | 4/1983 | Lomeli et al. |
| 4,544,590 A | 10/1985 | Egan |
| 4,620,727 A | 11/1986 | Stockburger et al. |
| 4,627,643 A | 12/1986 | Leonetti et al. |
| 4,643,455 A | 2/1987 | North et al. |
| 4,682,692 A | 7/1987 | Kessler |
| 4,724,166 A | 2/1988 | deBruin |
| 4,778,153 A | 10/1988 | Bachman et al. |
| 4,815,768 A | 3/1989 | Applebaum et al. |
| 4,839,507 A | 6/1989 | May |
| 4,854,610 A | 8/1989 | Kwiatek |
| 4,872,707 A | 10/1989 | deBruin |
| 4,944,532 A | 7/1990 | Pollard |
| 4,958,066 A | 9/1990 | Hedgcoth |

(List continued on next page.)

FOREIGN PATENT DOCUMENTS

| | | |
|---|---|---|
| EP | 0570317 A1 | 11/1993 |
| FR | 2566564 | 12/1985 |
| GB | 2143204 A | 2/1985 |
| JP | 6048072 | 2/1994 |

*Primary Examiner*—Michael G. Lee
*Assistant Examiner*—Ahshik Kim
(74) *Attorney, Agent, or Firm*—Wolf, Greenfield & Sacks, P.C.

(57) ABSTRACT

A transaction card assembly and method for forming a transaction card assembly. The transaction card assembly may include a transaction card and an auxiliary member attached to the transaction card. The transaction card and the auxiliary member may be formed from a same piece of material and may include a machine-readable feature, such as a barcode, magnetic strip or electronic device. The transaction card and/or the auxiliary member may meet ANSI and ISO specifications.

74 Claims, 5 Drawing Sheets

U.S. PATENT DOCUMENTS

| | | | | |
|---|---|---|---|---|
| 4,972,476 | A | 11/1990 | Nathans | |
| 4,978,146 | A | 12/1990 | Warther et al. | |
| 5,002,313 | A | 3/1991 | Salvatore | |
| 5,019,697 | A | 5/1991 | Postman | |
| 5,067,713 | A | 11/1991 | Soules et al. | |
| 5,131,516 | A | 7/1992 | Clough | |
| 5,173,081 | A | 12/1992 | Greig | |
| 5,281,799 | A | 1/1994 | McIntire et al. | |
| 5,282,649 | A | 2/1994 | Williams et al. | |
| 5,299,834 | A | 4/1994 | Kraige | |
| 5,308,120 | A | 5/1994 | Thompson | |
| 5,390,794 | A | 2/1995 | Vulpitta | |
| 5,427,832 | A | 6/1995 | Longtin | |
| 5,438,928 | A | 8/1995 | Chatwin | |
| 5,494,544 | A | 2/1996 | Hill et al. | |
| 5,495,981 | A | 3/1996 | Warther | |
| 5,501,491 | A | 3/1996 | Thompson | |
| 5,506,395 | A | 4/1996 | Eppley | |
| 5,514,860 | A | 5/1996 | Berson | |
| 5,522,623 | A | 6/1996 | Soules et al. | |
| 5,531,482 | A | 7/1996 | Blank | |
| 5,594,233 | A * | 1/1997 | Kenneth et al. | 235/492 |
| 5,609,253 | A | 3/1997 | Goade, Sr. | |
| 5,720,158 | A | 2/1998 | Goade, Sr. | |
| 5,740,915 | A | 4/1998 | Williams | |
| 5,769,457 | A | 6/1998 | Warther | |
| 5,921,584 | A | 7/1999 | Goade, Sr. | |
| 5,949,058 | A * | 9/1999 | Kimura | 235/486 |
| 5,997,042 | A | 12/1999 | Blank | |
| 6,036,099 | A * | 3/2000 | Leighton | 235/488 |
| 6,039,356 | A * | 3/2000 | Warther et al. | 283/61 |
| 6,109,439 | A | 8/2000 | Goade, Sr. | |
| 6,173,901 | B1 | 1/2001 | McCannel | |
| 6,199,757 | B1 * | 3/2001 | Kulbert | 235/380 |
| 6,305,716 | B1 * | 10/2001 | Warther et al. | 283/61 |
| 6,315,206 | B1 * | 11/2001 | Hansen et al. | 235/487 |
| 6,328,341 | B2 * | 12/2001 | Klure | 283/62 |

* cited by examiner

TRANSACTION CARD WITH ATTACHED AUXILIARY MEMBER

FIELD OF THE INVENTION

This invention relates to transaction cards.

BACKGROUND OF THE INVENTION

Transaction cards, such as credit and debit cards, membership cards, promotional cards, e.g., frequent flyer cards, identification cards and the like, are widely used. Such transaction cards may include a variety of different indicia to identify the card, the individual using the card, a transaction account, such as a credit card account, or other features. The indicia may include a string of alphanumeric characters, a bar code or an encoded magnetic strip attached to the card.

Transaction cards have been produced that include an advertising section attached to the card. For example, a prepaid phone card has been produced such that a rectangular transaction card has an advertising portion attached along a long edge of the transaction card. That is, the transaction card and attached advertising section are produced from a single piece of plastic or paper material with a perforation or other line of weakness positioned between the transaction card and the advertising section. The transaction card may be removed from the advertising section by bending or tearing along the perforation or line of weakness. This type of transaction card is typically made using a relatively thin paper or plastic material and results in the formation of a card that does not substantially meet American National Standards Institute (ANSI) and/or International Standards Organization (ISO) standards for transaction cards.

SUMMARY OF THE INVENTION

In an illustrative embodiment of the invention, a transaction card assembly includes a transaction card having a long edge and a short edge that is shorter than the long edge. The transaction card is configured to meet ANSI and ISO specifications, and at least one auxiliary member is attached at an edge of a long side of the transaction card.

In another illustrative embodiment, a transaction card assembly includes a transaction card having a machine-readable feature, and a long edge and a short edge that is shorter than the long edge. At least one auxiliary member is attached only at the long edge of the card.

In another illustrative embodiment of the invention, a method for forming a transaction card assembly includes providing a single sheet of plastic material, and cutting at least a transaction card and an auxiliary member from the sheet of material so that the transaction card has a long edge and a short edge shorter than the long edge, and so that the auxiliary member is attached to the transaction card only along a long edge of the transaction card. A line of weakness is provided between the transaction card and the auxiliary member, and a machine-readable feature is provided on at least one of the transaction card and the auxiliary member.

BRIEF DESCRIPTION OF THE DRAWINGS

Illustrative embodiments of the invention are described below with reference to the following drawings, in which like numerals reference like elements, and wherein.

DETAILED DESCRIPTION

As discussed above, transaction cards are widely used for a variety of different purposes, such as for credit and debit account purchases, tracking member activity (e.g., tracking frequent flyer activity), for gift-certificate purchases, and so on. Vendors issuing transaction cards for tracking member activity typically wish to ensure that users of an account receive transaction cards, keytags or other devices that are appropriately associated with the membership account. Vendors may also wish to provide advertising or other promotional information with a transaction card, e.g., to defer some of the cost of issuing the transaction card by having others pay for advertising included with the transaction card. As one example, a vendor may wish to issue a gift card or prepaid telephone card that entitles the bearer to a specified amount of purchase or telephone use credit. Advertising may be provided with the transaction card on a portion attached to the card to promote the vendor's service or other goods or services.

Figure 1:
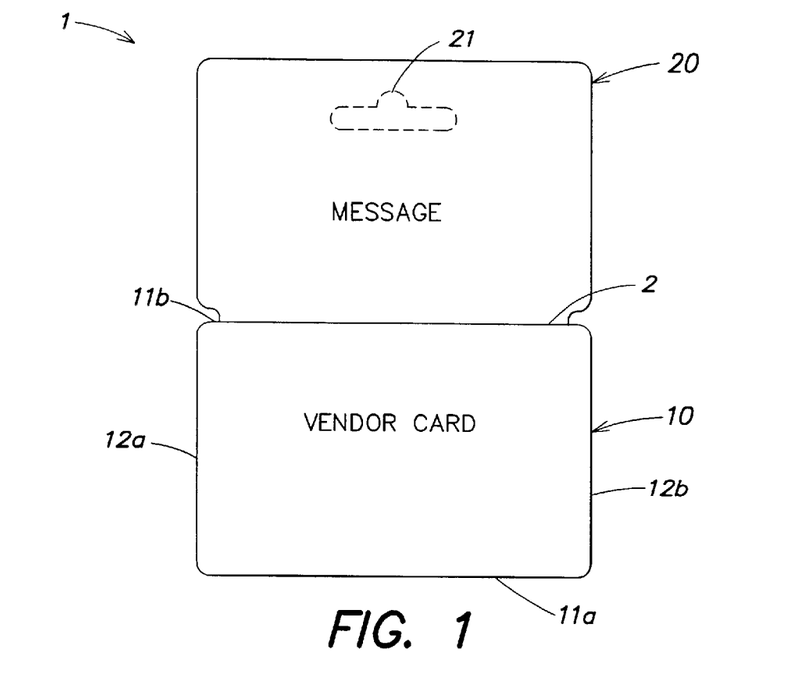
FIG. 1 is a first side of a transaction card assembly in accordance with an embodiment of the invention.
Figure 2:
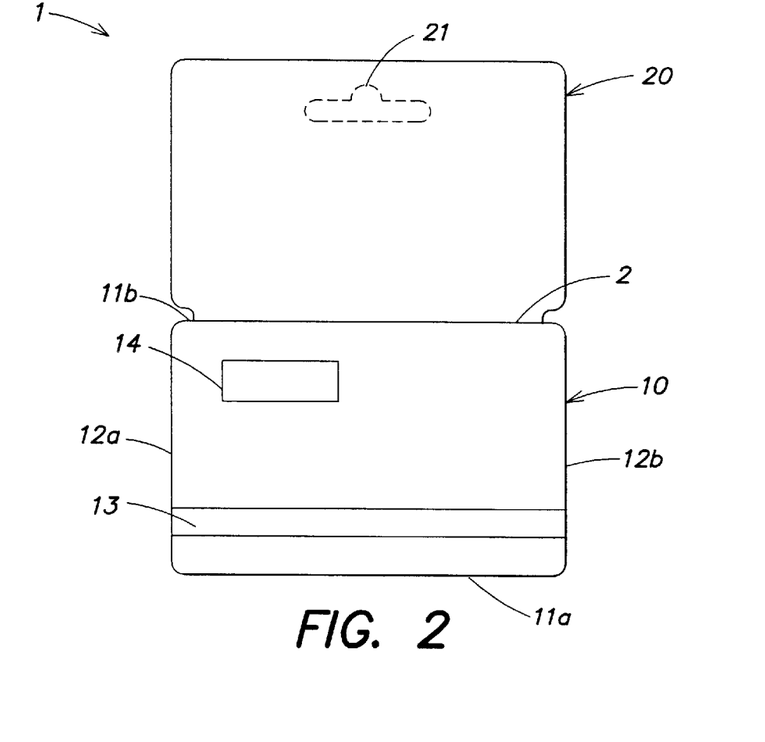
FIG. 2 is a second side of the transaction card assembly of FIG. 1.

FIGS. 1 and 2 show first and second sides, respectively, of a transaction card assembly in accordance with an embodiment of the invention. It should be understood that FIGS. 1 and 2 show only one illustrative embodiment of the invention and should not be used to narrowly interpret the scope of the invention. In addition, various aspects of the invention are described below. It should be understood that these various aspects may be used in a variety of different combinations. Therefore, the illustrative embodiments described below are not intended to show all aspects of the invention, but rather are used to describe a few embodiments of the invention.

The transaction card assembly 1 shown in FIG. 1 includes a transaction card 10 and an auxiliary member 20 attached to the transaction card 10. The transaction card 10 may be used, for example, as a credit or debit card, a membership identification card, an account identification card, a gift card, a prepaid telephone card, and so on. The auxiliary member 20 may also be used as a transaction card, but may alternately include any printed or otherwise presented material, such as advertising, handwritten information, a coupon or other purchase rebate information, a keytag, and so on.

The transaction card 10 and the auxiliary member 20 may be formed of any suitable material, such as a plastic or paper sheet material. If the transaction card 10 is intended to meet ANSI and ISO specifications, at least the transaction card 10 is made from a sheet of suitable material, e.g., poly vinyl chloride (PVC) or other material (e.g., PET, PETG, ABS or other plastic and/or synthetic materials) having a thickness of 0.030 inches±ten percent. However, ANSI and ISO specifications for transaction cards typically change over time, and therefore the transaction card 10 may be made of any suitable material, have any suitable dimensions or have any other feature to meet with desired ANSI and ISO specifications for transaction cards.

The auxiliary member 20 may be formed of the same material as the transaction card 10 and be attached to the transaction card 10 along a long edge 11 of the transaction card 10. For example, the transaction card 10 and the auxiliary member 20 may be stamped or die cut from a same sheet of plastic material. A line of weakness 2, which may include perforations, scoring, or other features, may be formed between the transaction card 10 and the auxiliary member 20. Using the line of weakness 2, the transaction card 10 and the auxiliary member 20 may be separated from each other by folding the auxiliary member 20 toward the transaction card 10 along the line of weakness 2, or by tearing along the line of weakness 2. The line of weakness 2 may be formed to allow separation of the auxiliary member 20 from the transaction card 10 so that at least the transaction card 10 edge where the auxiliary member 20 was attached has a smooth edge after separation, e.g., a sufficiently smooth edge to meet ANSI and ISO specifications. The line of weakness 2 is not a required feature, since the transaction card 10 and the auxiliary member 20 may be separated, if desired, by cutting the transaction card 10 and the auxiliary member 20 apart, e.g., using a scissor, shear or other suitable device or method.

In an alternative embodiment, the transaction card 10 and the auxiliary member 20 may be formed separately, and may be formed of different materials. The transaction card 10 and the auxiliary member 20 may then be brought together in an edge-to-edge relationship and connected together, e.g., along mating edges positioned similar to that shown for the line of weakness 2 in FIG. 1. The transaction card 10 and the auxiliary member 20 may be joined together at the edges by any suitable means, such as thermal welding, an adhesive, a mechanical fastener, a coupling device (e.g., a coupling having opposed channels into which the edges of the transaction card 10 and the auxiliary member 20 are inserted and held by the channels) and so on. In addition, the transaction card 10 and the auxiliary member 20 need not be joined in an edge-to-edge relationship. Instead, the auxiliary member 20 may overlap a portion of the transaction card 10 and be joined to the transaction card 10 at the overlap. The auxiliary member 20 may also be overlapped and attached to the transaction card 10 so that information or other features on the transaction card 10 are obscured from view until the transaction card 10 and auxiliary member 20 are separated. For example, the transaction card 10 may be a prepaid phone card having a personal identification number (PIN) or other character sequence that is used to obtain prepaid telephone services. The auxiliary member 20 may be attached to the transaction card 10 so that the PIN or other sequence is obscured from view so that it cannot be viewed (at least without detection) until after the phone card is activated at the time of purchase. In this alternative embodiment, the auxiliary member 20 may be separated from the transaction card 10 by bending the auxiliary member 20 relative to the transaction card 10, thereby causing an adhesive used to join the transaction card 10 and the auxiliary member 20 together to fail. As with the other examples described above, the auxiliary member 20 may be separated from the transaction card 10 by other means, such as by cutting, applying heat to the joint, and so on.

In the illustrative embodiment shown in FIG. 1, the auxiliary member 20 is attached to the transaction card 10 along a long edge 11b of the transaction card 10. That is, if a transaction card 10 is formed to meet current ANSI and ISO specifications, the transaction card 10 will have an approximately rectangular shape having two opposite long edges 11a and 11b and two opposite short edges 12a and 12b. The auxiliary member 20 may be attached to any one of the edges 11a, 11b 12a and 12b, or a combination of edges, such as edges 12a and 11b, if desired. Although the transaction card 10 and the auxiliary member 20 are shown in FIG. 1 as having an approximately rectangular shape, the transaction card 10 and/or the auxiliary member 20 may have any suitable shape, such as any polygon, circle, oval, and so on. Further, the auxiliary member 20 need not have the same shape or size as the transaction card 10 and may have several different, separable portions.

The transaction card 10 and/or the auxiliary member 20 may include any printed matter or otherwise display any suitable information, such as an advertisement, a credit card number, a message, an account number, a PIN number, one or more labels adhered to the transaction card 10 or the auxiliary member 20 that include information or cover information on the transaction card 10 or the auxiliary member 20, and so on. In this illustrated embodiment, the auxiliary member 20 includes the text "Message" and the transaction card 10 includes the text "Vendor Card" which are used to represent any suitable text, graphic or other information presentation. The transaction card 10 and/or the auxiliary member 20 may also include other features. For example, the auxiliary member 20 may include a hole 21 formed through the auxiliary member 20. This hole 21 may be used to hang or otherwise secure the transaction card assembly 1, the transaction card 10 and/or the auxiliary member 20 to a hook, key chain or other support. The transaction card 10 and/or the auxiliary member 20 may also include other similar features, such as a clip, pin or other fastener. As one example, the auxiliary member 20 may be provided with a clip to attach the auxiliary member 20 to a garment. The auxiliary member 20 may be printed with information, such as an individual's name and photo identification so that the individual may wear the auxiliary member 20 as a security badge. The transaction card 10 may be detached from the auxiliary member 20 and used, for example, as a pass key. Alternately, the transaction card 10 may be removed by security personnel when the individual passes a security checkpoint. Thus, the transaction card 10 in this example may be used as a form of ticket to gain admission to a particular area.

As another example, the transaction card assembly 1 may be used as part of a transaction tracking system. For example, the transaction card 10 may be used as a gift card to purchase items at a retail outlet. Retailers selling the gift card may use the auxiliary member 20 to advertise the gift card, provide a place for a written message to be placed by the giver of the gift card, and so on. A hole 21 in the auxiliary member 20 may be used to hang the assembly 1 from a hook or other display device.

FIG. 2 shows a second side of the transaction card assembly of FIG. 1. As with the first side of the transaction card assembly 1 shown in FIG. 1, the second side of the transaction card assembly 1 may include any suitable printed or otherwise displayed information. Thus, text or graphics information may be printed directly onto, physically stamped into, adhered to, or otherwise placed, e.g., by a label 14, on the transaction card 10 and/or the auxiliary member 20. The transaction card 10 or the auxiliary member 20 may also include one or more machine readable features either of the same type or of different types, e.g., two magnetic strips, a magnetic strip and a bar code, etc. Further, the machine readable features, like any other information on the transaction card 10 and/or the auxiliary member 20 may be placed on any suitable side or location of the card 10 or the auxiliary member 20. In the example shown in FIG. 2, the transaction card 10 includes a machine readable feature in the form of a magnetic strip 13. The magnetic strip 13 may be encoded with suitable information as is common with credit cards, debit cards and automatic teller machine (ATM) cards. The magnetic strip 13 may be heat laminated to the transaction card 10, e.g., in a way to meet current or future ANSI and ISO standards, or may be positioned on the transaction card in other ways. For example, the magnetic strip 13 may be fixed to the transaction card 10 by an adhesive. Use of a magnetic strip 13 that meets ANSI and ISO specifications may be required for specific applications, such as credit card applications where the magnetic strip 13 may be repeatedly read over its lifetime. However, the magnetic strip 13 may be fixed to the transaction card 10 in a less robust way for less demanding applications, such as where the magnetic strip 13 may be read only once or twice over its lifetime.

The transaction card 10 and/or the auxiliary member 20 may include other machine readable features, such as bar codes or other passive devices. The transaction card 10 and/or the auxiliary member 20 may also include more active devices, such as semiconductor devices found in electronic cash cards like that described in U.S. Pat. No. 5,971,282. Thus, the transaction card 10 and/or the auxiliary member 20 may include any suitable electronic device capable of providing identification information, receiving and processing information or performing other desired transaction functions. The machine readable features may be used to store, obtain, transmit or otherwise handle any type of information, such as text, biometrics information (such as eyescan or fingerprint information) and so on.

As discussed above, one or more labels 14 may be attached to the transaction card 10 and/or the auxiliary member 20. A label 14 may be attached so that the label 14 is removable and reusable, e.g., can be removed and adhered again to the transaction card 10 and/or the auxiliary member 20 or to another surface, so that the label 14 is removable but cannot be reattached to any surface, or so that the label 14 is not removable (without damaging the label 14). The label 14 may include any information, e.g., that is printed on the label 14, and/or the label 14 may obscure information on the transaction card 10 and/or the auxiliary member 20 from view. For example, the label 14 may obscure a PIN number on the transaction card 10 that is used to obtain prepaid telephone services and not be removable without detection. Thus, the account associated with the transaction card 10 may be activated, e.g., at the time of purchase, and the label 14 removed to reveal the PIN number to the purchaser. The label 14 may also include a machine readable feature, such as a magnetic strip 13, that is adhered to the transaction card 10 and/or the auxiliary member 20.

Figure 3:
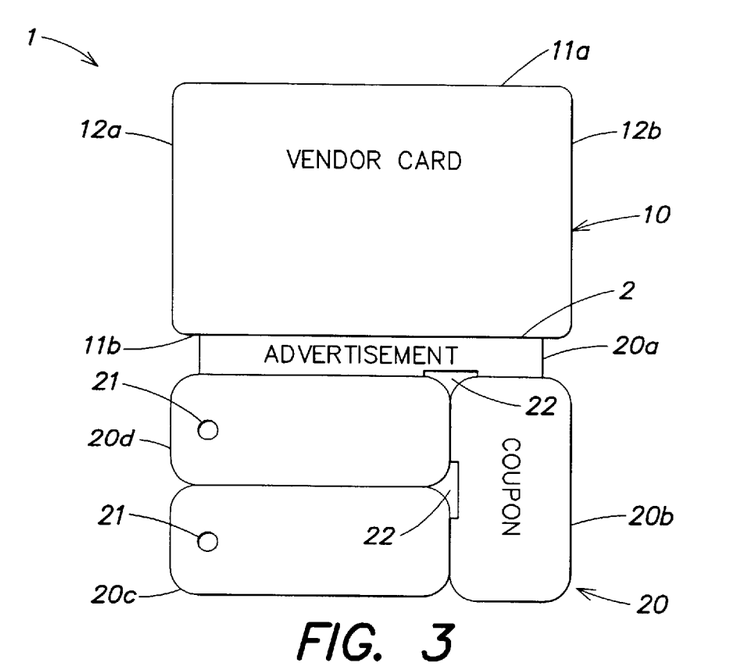
FIG. 3 is a first side of a transaction card assembly in accordance with another embodiment of the invention.
Figure 4:
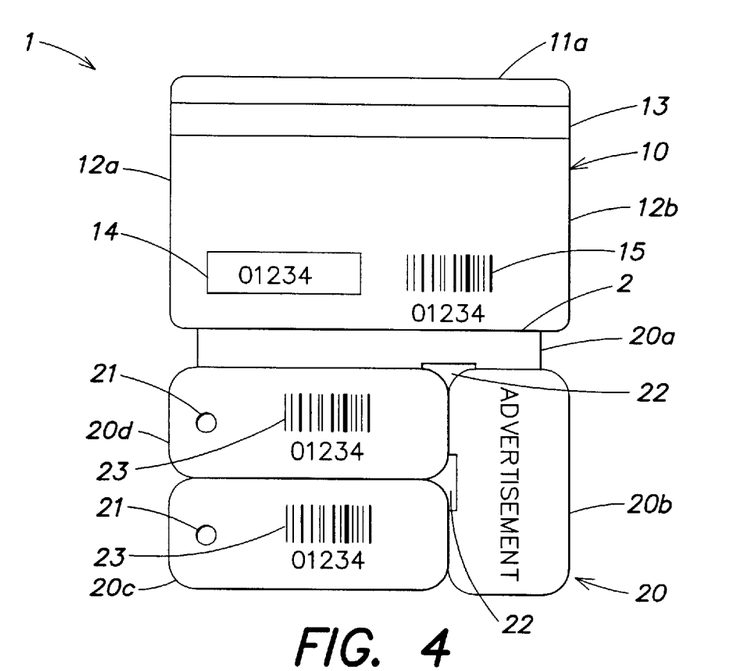
FIG. 4 is a second side of the transaction card assembly of FIG. 3.

FIGS. 3 and 4 show first and second sides, respectively, of another illustrative embodiment of the invention. In this embodiment, an auxiliary member 20 includes four different sections that are attached to the transaction card 10. In this embodiment, the auxiliary member 20 includes an advertisement section 20a, a coupon section 20b, and two key tags 20c and 20d. Although functional names have been provided for each of the sections 20a–20d of the auxiliary member 20 in this embodiment, these names have been used for ease of reference and understanding, but should not be construed as limiting the possible functions to be performed by or other features to be included in any of the sections 20a–20d.

In this embodiment, the transaction card 10 and the auxiliary member 20 are formed from a single sheet of material that is stamped to define the outer periphery of the transaction card 10 and auxiliary member 20, as well as optional holes 21 in the key tags 20c and 20d and/or holes 22 that help define the shape of the key tags 20c and 20d. The holes 21 and 22 are not required. The stamping process may also include a scoring and/or perforating function to form the line of weakness 2 that separates the auxiliary member 20 and the transaction card 10. Lines of weakness 2 may also be formed between the portions 20a–20d of the auxiliary member 20. However, as discussed above, the various portions of the transaction card assembly 1 may be separately formed and then joined together in any suitable way. For example, the transaction card 10 and the auxiliary member 20 may be separately formed and then joined in an edge-to-edge fashion by an adhesive, thermal welding or other suitable process.

As with the other examples described above, the transaction card 10 and any of the portions 20a–20d of the auxiliary member 20 may include any type of printed information, such as advertisements, coupon or other purchase rebate information, a vendor name, and so on, or no information at all. In short, the invention is not limited in the way that information is presented or the type of information presented on any portion of the transaction card assembly 1.

FIG. 4 shows a second side of the transaction card assembly 1 shown in FIG. 3. In this embodiment, the transaction card 10 includes machine-readable features such as a magnetic strip 13 and a barcode 15. As with the other examples described above, the magnetic strip 13 may be formed on the transaction card 10 in any suitable way, such as by a heat lamination or other suitable process. The transaction card 10, including the magnetic strip 13, the barcode 15 or other features may be made to meet current or future ANSI and ISO specifications for transaction cards, such as credit cards.

The transaction card 10 and/or any portion 20a–20d of the auxiliary member 20 may also include one or more labels 14. The labels 14 may be removable or non-removable from the transaction card 10, and may or may not include indicia that match other indicia on the transaction card 10. For example, the label 14 may include an alphanumerical string that matches an alphanumerical string encoded in the barcode 15 and/or the magnetic strip 13. Indicia on the label 14, the magnetic strip 13 and/or the barcode 15 may be unique with respect to transaction card assemblies 1 in a set of assemblies 1. For example, each transaction card assembly 1 may include indicia, such as an account number, that is unique to that transaction card assembly 1. A plurality of transaction card assemblies 1 each having unique indicia may be included in a set of assemblies 1 that are used, for example, as part of a member transaction tracking system, such as a frequent flyer program or grocery store membership program. If the indicia on the label 14 matches indicia on the transaction card 10 (such as the indicia encoded in the barcode 15 and/or the magnetic strip 13), the label 14 may be removed from the transaction card 10 when the transaction card 10 is placed into service. For example, as part of an issuee registration procedure, an issuee may complete a registration form including the issuee's name, address and other suitable information and place the label 14 containing the unique indicia on the registration form. Thus, the issuee or transaction card 10 issuer may be more easily assured that the proper indicia, such as an account number, included on the label 14 and in the barcode 15 or magnetic strip 13 is included in the registration form. This can ensure that the proper issuee information is associated with the account number included in the transaction card 10.

As another example, the label 14 may include a personal identification number (PIN) that is personal to authorized users of the transaction card 10. Thus, an issuee of the transaction card 10 may remove the label 14 containing a PIN and attach the label 14 to a registration form or other document that is kept separate from the transaction card 10.

Although the label 14 is shown as attached to the transaction card 10, one or more labels 14 may be provided on the transaction card 10 and/or any portion 20a–20d of the auxiliary member 20. In addition, any portion 20a–20d of the auxiliary member 20 may include any suitable information such as a barcode 23 on the key tags 20c and 20d. The bar code 23 may match the bar code 15 or other indicia included on the transaction card 10, or may be different. Similarly, the key tags 20c and 20d (or other portions of the auxiliary member 20) may include one or more labels 14 that correspond to indicia included on the key tags 20c and 20d (or other portions 20a and 20b). As one example, a transaction card 10, a key tag 20c and a key tag 20d may all include different account numbers that are part of a same account. These account numbers may be encoded, for example, in a barcode 15 or 23. The transaction card 10, the key card 20c and key card 20d may also include a label 14 that includes indicia, such as an alphanumerical string, that matches the indicia included in the barcode 15 or 23. Thus, when the account associated with the transaction card assembly 1 is placed into service, issuee information or other suitable information may be provided on a registration form and each of the labels 14 removed from the transaction card 10, and the key cards 20c and 20d and placed on the registration form. The labels 14 placed on the registration form may be placed so that they correspond with specific sets of issuee information on the registration form. For example, a first family member may be issued the transaction card 10 and the label 14 is placed on the registration form in association with the first member's information. A second member may be issued the key card 20c and a label 14 on the key card 20c may be placed on the registration form in association with the second member's information, and so on.

The embodiment shown in FIGS. 3 and 4 is only one example of a transaction card assembly 1. It should be understood that various portions 20a–20d may be omitted, moved in position relative to other portions 20a–20d, and so on. For example, the advertisement portion 20a may be omitted and the coupon portion 20b and the key tag 20d may be attached directly to the transaction card 10 along the edge 1b. As another example, the coupon section 20b may be omitted and the key tags 20c and 20d made longer. Any of the portions 20a–20d may also include a machine-readable feature, such as a magnetic strip 13, barcode, electronic chip or other device, and so on.

In the embodiments described above, the magnetic strip 13 is placed near a long edge 11a opposite the auxiliary member 20. This placement allows the magnetic strip 13 to extend between the short edges 12a and 12b of the transaction card 10 and allows easier encoding of the strip 13 while the auxiliary member 20 is attached to the transaction card 10. However, it should be understood that the magnetic strip 13 need not be arranged as shown in FIGS. 2 and 4. Instead, two or more magnetic strips 13 may be included and/or a magnetic strip 13 may extend in any suitable direction along, or on any side of, the transaction card 10 and/or the auxiliary member 20. Magnetic strips 13 or any other machine readable feature may be placed on the transaction card 10 and/or the auxiliary member 20 in a position such that the strip 13 or other feature can be read by a machine, such as a magnetic strip reader, without detaching the auxiliary member 20 from the transaction card 10.

The arrangements shown in FIGS. 1–4, and other described or similar arrangements, allow encoding of the magnetic strip 13, application of and/or printing of indicia on the label 14 and/or printing of the bar codes 15 and 23 and/or application of other information on the transaction card assembly 1 in one pass while the transaction card assembly 1 is fully assembled. That is, a transaction card assembly 1 may be formed, e.g., stamped, from a single sheet of plastic either with or without the magnetic strip 13 being previously fixed to the transaction card 10. If the magnetic strip 13 has been previously attached to the sheet of plastic before stamping, the transaction card assembly 1 may be subjected to an encoding process that stores information, such as an account number, an account credit value, and so on, in the magnetic strip 13 before the transaction card assembly 1 is cut from the sheet. Of course, the magnetic strip 13 may be attached to the transaction card assembly 1, or the magnetic strip 13 may be encoded, after the assembly 1 is cut from the sheet. Thus, it is not necessary, although possible, to encode the magnetic strip 13 before the auxiliary member 20 is attached to the transaction card 10. Similarly, the labels 14 may be applied and/or printed and the barcodes 15 and 23, advertisements or other features may be applied to the transaction card assembly 1 while the transaction card 10 and the auxiliary member 20 are attached. This allows the transaction card assembly 1 to be completely formed and ready for use without requiring the separate manufacture of the transaction card 10 or any portions of the auxiliary member 20 before assembling the transaction card 10 and portions of the auxiliary member 20 together to form the transaction card assembly 1. However, it should be understood that the transaction card 10 and/or the auxiliary member 20 may be manufactured, in whole or in part, before the transaction card 10 and the auxiliary member 20 are attached to each other. As discussed above, portions of the auxiliary member may be attached directly to the transaction card 10 or attached to the transaction card 10 through an intermediate member, such as the advertisement portion 20a. The auxiliary member 20 may be attached along an edge 11b of the transaction card 10, e.g., in an edge-to-edge fashion by thermal welding, an adhesive, mechanical devices or other suitable means.

Figure 5:
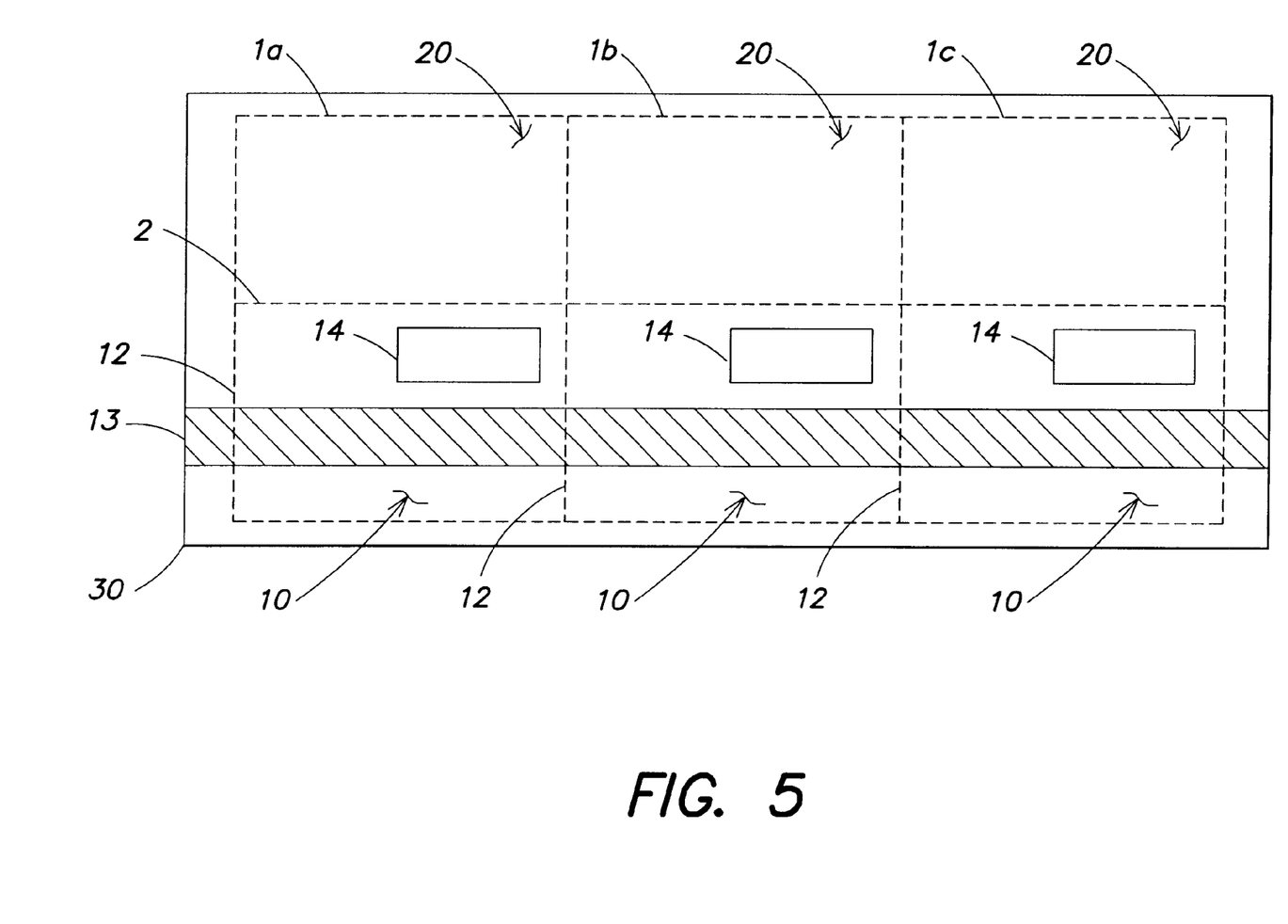
FIG. 5 shows a stage of a transaction card assembly manufacturing process.

As one example manufacturing process, a sheet 30 of material, e.g., a sheet of PVC, such as that shown in FIG. 5, may be provided to form a plurality of transaction card assemblies 1. In the example shown in FIG. 5, three transaction card assemblies 1a–1c are formed from the sheet 30, although more or fewer than three assemblies 1 may be formed from the sheet 30. In addition, the assemblies 1 shown in FIG. 5 have a configuration similar to that shown in FIGS. 1 and 2, but it should be understood that the assemblies 1 may have any suitable configuration, such as those described above or others. Information for a plurality of transaction card assemblies 1, e.g., advertisements, text, graphics, holograms, bar codes, magnetic strips, embossed features, etc. (all not shown in FIG. 5), may be printed, stamped or otherwise formed on one or both sides of the sheet 30. A magnetic strip 13 may be formed, e.g., by a thermal lamination process, along a length of the sheet 30, and optionally encoded with information for a plurality of transaction card assemblies 1. Labels 14 for a plurality of transaction card assemblies 1 may be applied to the sheet and information printed the labels (if the information is not included on the labels before the labels are applied). This processing may result in a plurality of transaction card assemblies 1 being formed on the sheet such that the short edges 12 of the transaction cards 10 in the assemblies 1 are adjacent one another. The sheet may then be cut, e.g., stamped or die cut, so that the individual transaction card assemblies 1 are formed and separated from the sheet. Lines of weakness 2 may also be formed between the transaction cards 10 and the auxiliary members 20, e.g., at the time of cutting the assemblies 1 from the sheet 30. Of course, the order of the steps in this process may be performed in any suitable order, e.g., encoding after or before cutting, applying labels 14 before or after printing information on the sheet 30, applying the magnetic strip 13 before or after cutting, etc.

Not positioning any members, e.g., a portion of an auxiliary member 20, along the short edges 12 of a transaction card 10 in a transaction card assembly 1 may simplify the process of forming a plurality of assemblies 1 from a single sheet 30 of material. For example, since a plurality of assemblies 1 can be formed on a single sheet 30 so that the short edges 12 of the transaction cards 10 in the assemblies 1 are adjacent each other, a magnetic strip 13 can be continuously formed along a length of a sheet of material for a plurality of transaction cards 10. Portions of the magnetic strip 13 may also be encoded with information for each of the transaction cards 10 before the plurality of assemblies 1 are cut from the sheet, which may simplify and speed the manufacturing process. Further, since the transaction cards 10 are adjacent at the short edges 12 in this example, cutting of the transaction card assemblies 1 from the sheet minimizes waste of material, including the magnetic strip 13 formed on the sheet.

Figure 6:
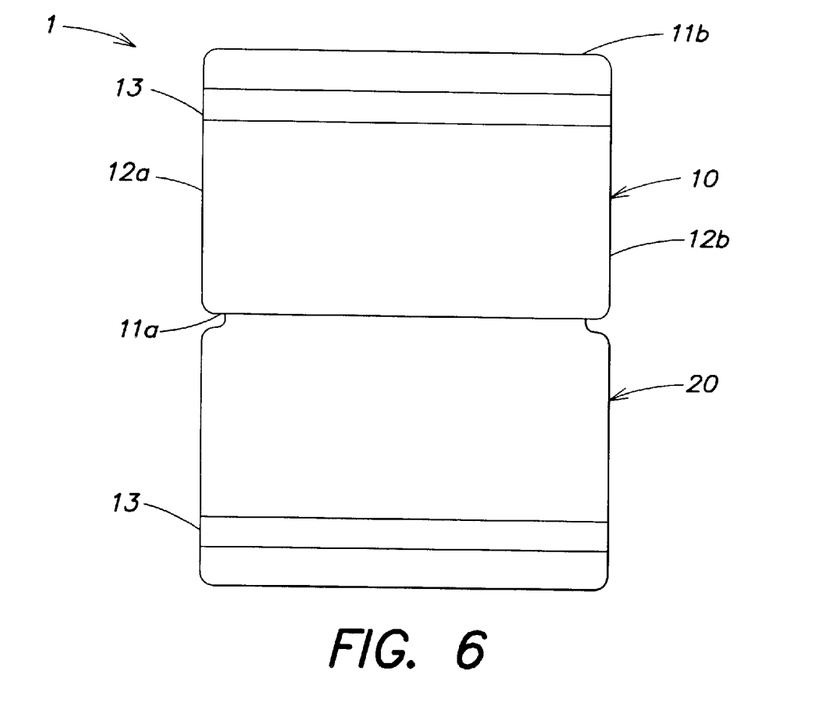
FIG. 6 shows a pair of transaction cards attached along a long edge.

FIG. 6 shows an illustrative embodiment in which the auxiliary member 20 is formed to function as a transaction card. Thus, the auxiliary member 20 may be formed identically or nearly identically, to the transaction card 10. In this example, the auxiliary member 20 may be formed as a transaction card that is joined with the transaction card along a long edge 11a of the card 10. This configuration may be useful, for example, when two credit cards are issued to two different people under a same credit card account. Since the transaction card 10 and the auxiliary member 20 (now also a credit card) may be formed together, the risk of providing the wrong credit cards in a same envelope sent to the credit card issuees is reduced. That is, both the transaction card 10 and the auxiliary member 20 may be formed to include a stamped credit card number, issuee name, expiration date, include an encoded magnetic strip and other suitable information without the transaction card 10 and the auxiliary member 20 being separated. Thus, credit cards that are related to a same account may be physically connected until separated by the credit card issuees.

Although only two magnetic strips 13 are shown extending along opposite edges of the transaction card 10 and the auxiliary member 20, the magnetic strips 13 may be located in any other suitable position, and the transaction card 10 and the auxiliary member 20 may include any other features described above, such as printed information, labels 14, other machine readable features, etc.

Figure 7:
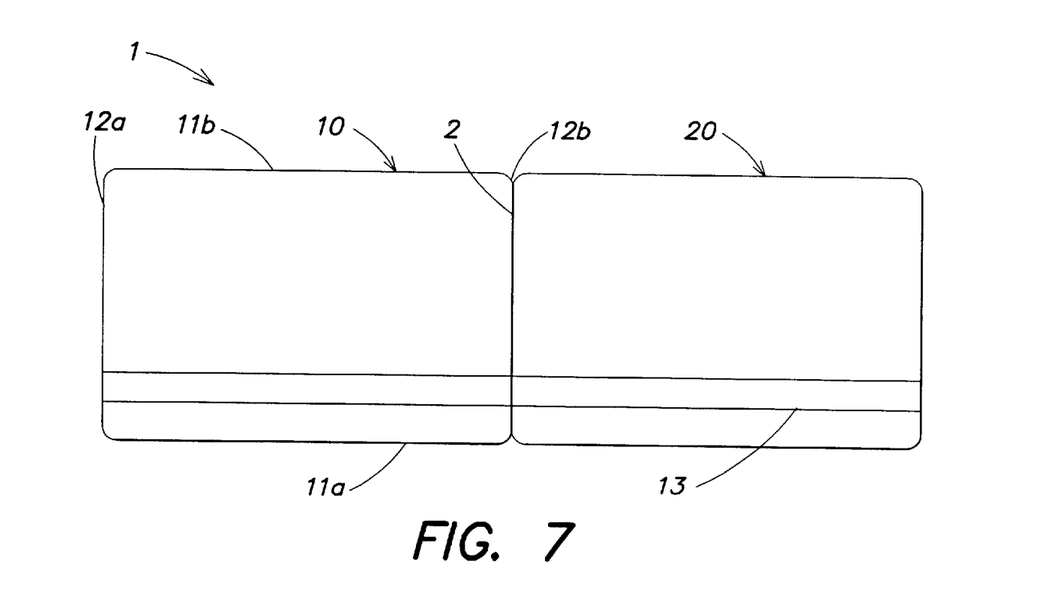
FIG. 7 shows a pair of transaction cards attached along a short edge.

FIG. 7 shows another illustrative embodiment in which the auxiliary member 20 is formed to function as a transaction card. However, in this example, the auxiliary member 20 is attached to the transaction card 10 along a short edge 12b of the card 10. The magnetic strips 13 are formed on the transaction card 10 and the auxiliary member 20 along a single continuous line, but other arrangements are possible. This arrangement has the same, or similar, advantages as the embodiment of FIG. 6. It should be understood that the auxiliary member 20 in this embodiment, as with all other embodiments, may include other portions, such as advertising portions, key tag portions, and so on, in addition to the transaction card portion.

Figure 8:
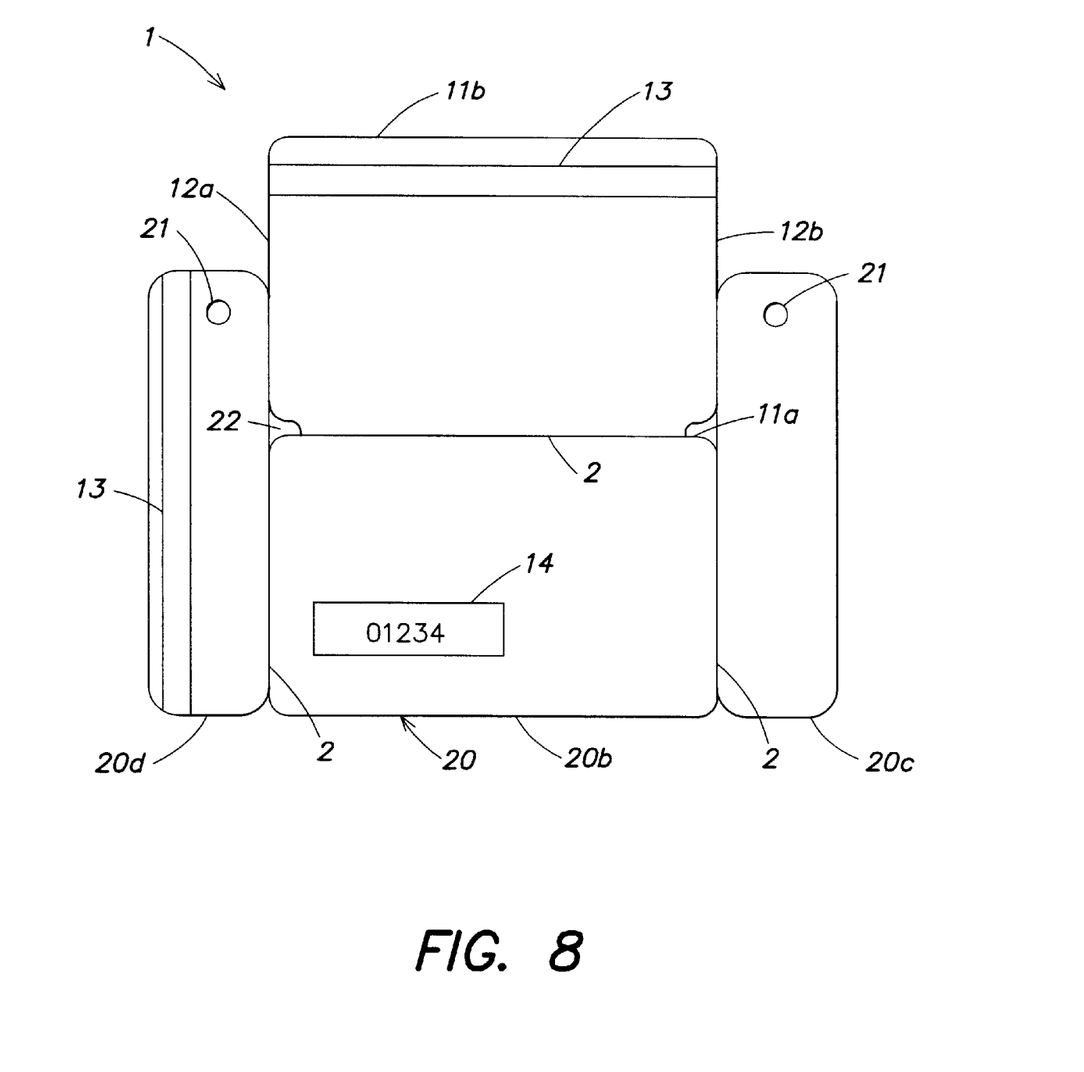
FIG. 8 shows transaction card assembly in accordance with another embodiment of the invention.

FIG. 8 shows another embodiment of a transaction card assembly 1 in which the auxiliary member 20 has portions attached at a long edge 11a and two short edges 12a and 12b of the transaction card 10. As with any of the embodiments above, the transaction card 10 and/or any portion of the auxiliary member 20 may include any suitable information on any side, may include machine readable features, such as magnetic strips 13, in any suitable orientation, and so on. In this example, the key tag portions 20c and 20d extend only partially along the short edges 12a and 12b of the transaction card 10, i.e., are set back from the edge 11b of the transaction card 10 near which the magnetic strip 13 is formed, allowing the magnetic strip 13 to be more easily read/encoded by a typical magnetic strip reader/encoder while the key tags 20c and 20d are attached to the transaction card 10. However, the key tags 20c and 20d may extend along the entire edges 12a and 12b of the transaction card 10, or may not extend to the transaction card 10 at all and be attached only to the portion 20b of the auxiliary member 20. One key tag 20d includes a magnetic strip 13 in this example, but both key tags 20c and 20d may include any machine readable or other feature. In addition, a single label 14 is shown attached to the portion 20b, but additional labels 14 may be used and adhered to any side of the transaction card 10 and/or the auxiliary member 20. The label 14 may include, or obscure, any information, such as indicia that matches indicia included in the magnetic strip 13 on the transaction card 10 and/or the key tag 20d. The indicia on the label 14 and other portions of the transaction card assembly 1 may be unique to all other transaction card assemblies 1 in a set of assemblies, such as those used to track member purchase/use activity.

While the invention has been described in conjunction with specific embodiments thereof, it is evident that many alternatives, modifications, and variations will be apparent to those skilled in the art. Accordingly, embodiments of the invention as set forth herein are intended to be illustrative, not limiting. Various changes may be made without departing from the spirit and scope of the invention.

What is claimed is:

1. A transaction card assembly comprising:
   a transaction card having a long edge and a short edge that is shorter than the long edge, the transaction card configured to meet ANSI and ISO specifications for transaction cards; and
   at least one auxiliary member attached in an edge-to-edge fashion at a long edge of the transaction card;
   wherein the transaction card meets ANSI and ISO specifications for edge roughness when separated from the at least one auxiliary member without the use of a tool.

2. The assembly of claim 1, further comprising a machine readable feature on the transaction card near a side opposite the auxiliary member.

3. The assembly of claim 1, further comprising a line of weakness between the transaction card and the at least one auxiliary member.

4. The assembly of claim 3, wherein the transaction card and the at least one auxiliary member are formed from a same sheet of material, and the line of weakness is a scoring of the material between the transaction card and the at least one auxiliary member.

5. The assembly of claim 1, wherein the transaction card has an approximately rectangular shape.

6. The assembly of claim 5, wherein the at least one auxiliary member includes a portion having an approximately rectangular shape and is approximately the same size as the transaction card.

7. The assembly of claim 6, wherein the portion of the auxiliary member includes a hole formed through the portion.

8. The assembly of claim 6, wherein the portion of the auxiliary member includes an area for applying a handwritten message to the portion.

9. The assembly of claim 8, wherein the transaction card is a gift card.

10. The assembly of claim 1, wherein the at least one auxiliary member includes at least one of a coupon portion, an advertisement portion, and a key tag.

11. The assembly of claim 1, wherein at least one of the transaction card and the auxiliary member includes a machine-readable feature.

12. The assembly of claim 11, wherein the machine-readable feature is a magnetic strip.

13. The assembly of claim 12, wherein the magnetic strip is fixed to the transaction card and meets ANSI and ISO specifications.

14. The assembly of claim 11, wherein the machine-readable feature is one of a barcode and an electronic device.

15. The assembly of claim 1, wherein at least one of the transaction card and the auxiliary member includes a label.

16. The assembly of claim 15, wherein the label includes indicia that corresponds to indicia included on at least one of the transaction card and the auxiliary member.

17. The assembly of claim 16, wherein the label is removable and adherable to another surface.

18. The assembly of claim 15, wherein the label obscures information on one of the transaction card and the auxiliary member.

19. The assembly of claim 18, wherein the label obscures a PIN number for a prepaid telephone account on one of the transaction card and the auxiliary member.

20. The assembly of claim 1, wherein the transaction card includes a magnetic strip that is encoded while the auxiliary member is attached to the transaction card.

21. The assembly of claim 20, wherein at least one of the transaction card and the auxiliary member includes a label that is adhered and printed while the auxiliary member is attached to the transaction card.

22. The assembly of claim 20, wherein at least one of the transaction card and the auxiliary member include a barcode that is printed while the auxiliary member is attached to the transaction card.

23. The assembly of claim 1, wherein no auxiliary member is attached at a short edge of the transaction card.

24. The assembly of claim 1, wherein the auxiliary member includes at least a portion attached at a short edge of the transaction card.

25. The assembly of claim 24, further comprising a machine readable feature positioned near a second long edge of the transaction card opposite the long edge, wherein the portion of the auxiliary member attached at a short edge of the transaction card is set back from the second long edge.

26. The assembly of claim 1, wherein at least a portion of the auxiliary member is formed to function as a transaction card.

27. A transaction card assembly comprising:
a transaction card having a machine-readable feature, a long edge and a short edge that is shorter than the long edge; and
at least one auxiliary member attached to the card in an edge-to-edge fashion, the transaction card and the at least one auxiliary member arranged to allow the at least one auxiliary member and the transaction card to be separated without tools, the transaction card meeting ANSI and ISO specifications for edge roughness for a transaction card after being separated from the at least one auxiliary member.

28. The assembly of claim 27, wherein the machine-readable feature is a magnetic strip.

29. The assembly of claim 27, wherein the machine-readable feature is a barcode.

30. The assembly of claim 27, wherein at least one of the transaction card and the auxiliary member includes a removable label.

31. The assembly of claim 30, wherein the removable label includes indicia that corresponds to information contained in the machine-readable feature.

32. The assembly of claim 31, wherein the label includes indicia that corresponds to indicia printed on at least one of the transaction card and the auxiliary member.

33. The assembly of claim 30, wherein the label is removable and adherable to another surface.

34. The assembly of claim 30, wherein the label obscures information on one of the transaction card and the auxiliary member.

35. The assembly of claim 34, wherein the label obscures a PIN number for a prepaid telephone account on one of the transaction card and the auxiliary member.

36. The assembly of claim 35, wherein the auxiliary member includes:
an intermediate portion attached to the long edge of the transaction card in an edge-to-edge fashion; and
at least one of a key tag portion and a coupon portion attached to the intermediate portion.

37. The assembly of claim 36, wherein the auxiliary member includes a key tag that has a machine-readable feature that includes information that corresponds to information stored in a machine-readable feature included on the transaction card.

38. The assembly of claim 36, wherein the transaction card and the auxiliary member are formed from a same sheet of plastic material, and a line of weakness is formed between the transaction card and the intermediate portion.

39. The assembly of claim 27, wherein the at least one auxiliary member is attached in an edge-to-edge fashion along the long edge of the transaction card.

40. The assembly of claim 27, wherein the transaction card and the at least one auxiliary member are formed from a same sheet of material and a line of weakness is formed between the transaction card and the at least one auxiliary member.

41. The assembly of claim 27, wherein the transaction card has an approximately rectangular shape.

42. The assembly of claim 41, wherein the at least one auxiliary member includes a portion having an approximately rectangular shape and is approximately the same size as the transaction card.

43. The assembly of claim 42, wherein the portion of the auxiliary member includes a hole formed through the portion.

44. The assembly of claim 42, wherein the portion of the auxiliary member includes an area for applying a handwritten message to the portion.

45. The assembly of claim 44, wherein the transaction card is a gift card.

46. The assembly of claim 27, wherein the at least one auxiliary member includes at least one of a coupon portion, an advertisement portion, and a key tag.

47. The assembly of claim 27, wherein the machine-readable feature is an electronic device.

48. The assembly of claim 27, wherein the machine readable feature is a magnetic strip that is encoded while the auxiliary member is attached to the transaction card.

49. The assembly of claim 48, wherein at least one of the transaction card and the auxiliary member includes a label that is adhered and printed while the auxiliary member is attached to the transaction card.

50. The assembly of claim 49, wherein at least one of the transaction card and the auxiliary member include a barcode that is printed while the auxiliary member is attached to the transaction card.

51. The assembly of claim 44, wherein the assembly includes one of a gift card, a prepaid phone card, a frequent shopper card, a loyalty card and a membership card.

52. A method for forming a transaction card assembly having a transaction card and at least one auxiliary member, comprising:

providing a single sheet of material;

cutting at least a transaction card and an auxiliary member from the sheet of material;

providing a line of weakness between the transaction card and the auxiliary member so that the transaction card meets ANSI and ISO specifications for edge smoothness after being separated without tools from the auxiliary member; and providing a machine-readable feature on at least one of the transaction card and the auxiliary member.

53. The method of claim 52, further comprising:

forming a magnetic strip on at least one of the transaction card and the auxiliary member; and encoding the magnetic strip while the auxiliary member is attached to the transaction card.

54. The method of claim 53, further comprising:

adhering a label to at least one of the transaction card and the auxiliary member while the auxiliary member is attached to the transaction card.

55. The method of claim 54, further comprising:

printing information on the label on at least one of the transaction card and the auxiliary member while the auxiliary member is attached to the transaction card.

56. The method of claim 55, further comprising:

printing a barcode on at least one of the transaction card and the auxiliary member while the auxiliary member is attached to the transaction card.

57. The method of claim 52, wherein the step of cutting at least the transaction card and the auxiliary member comprises:

cutting so that the transaction card has an approximately rectangular shape.

58. The method of claim 57, wherein the step of cutting comprises:

cutting so that the auxiliary member includes a portion having an approximately rectangular shape and is approximately the same size as the transaction card.

59. The method of claim 58, further comprising:

forming a hole in the auxiliary member.

60. The method of claim 58, further comprising: forming an area on the auxiliary member to receive a handwritten message.

61. The method of claim 52, wherein the step of cutting comprises:

cutting so that the auxiliary member includes at least one of a coupon portion, an advertisement portion, and a key tag.

62. The method of claim 52, wherein the step of providing the machine-readable feature comprises:

forming a magnetic strip on at least one of the transaction card and the auxiliary member.

63. The method of claim 62, wherein the step of forming the magnetic strip comprises:

forming the magnetic strip so that the magnetic strip meets ANSI and ISO specifications.

64. The method of claim 52, wherein the step of providing the machine-readable feature comprises:

forming a barcode on at least one of the transaction card and the auxiliary member.

65. The method of claim 52, wherein the step of providing the machine-readable feature comprises:

attaching an electronic device to at least one of the transaction card and the auxiliary member.

66. The method of claim 52, further comprising:

providing a label on at least one of the transaction card and the auxiliary member.

67. The method of claim 66, further comprising:

printing indicia on the label that corresponds to indicia printed on at least one of the transaction card and the auxiliary member.

68. The method of claim 66, wherein the step of providing a label comprises: providing a label that is removable and adherable to another surface.

69. The method of claim 52, wherein the step of providing a single sheet of plastic material comprises:

providing a sheet of material such that the transaction card cut from the sheet meets ANSI and ISO specifications.

70. The method of claim 52, wherein the step of providing a single sheet of plastic material comprises providing a sheet that is larger than a single transaction card assembly;

wherein the step of providing a machine-readable feature comprises forming a magnetic strip along a length of the sheet; and wherein the step of cutting comprises cutting a plurality of transaction card assemblies from the sheet so no auxiliary member is attached along a short edge of the transaction cards in the transaction card assemblies.

71. The method of claim 70, wherein the step of providing a machine-readable feature comprises encoding the magnetic strip with information for a plurality of transaction card assemblies.

72. A transaction card assembly comprising: two transaction cards each having a magnetic strip and meeting ANSI and ISO specifications for transaction cards that are joined along short edges of the transaction cards, the transaction cards being separable from each other without tools and meeting ANSI and ISO specifications for edge smoothness after separation.

73. A transaction card assembly comprising:

a transaction card portion including indicia used to associate a transaction with an issue of the transaction card assembly, the indicia on the transaction card portion uniquely identifying the transaction card assembly from other transaction card assemblies in a plurality of transaction card assemblies;

an auxiliary member portion that is attached to the transaction card portion in an edge-to-edge fashion and includes a keytag portion, the keytag portion and transaction card portion being separable without the use of tools; and a removable element attached to one of the transaction card portion and the auxiliary member portion, the removable element including indicia that corresponds to the indicia on the transaction card;

wherein the transaction card portion and the auxiliary member portion are not connected to any other transaction card portion that includes indicia different from the indicia on the transaction card portion, and the transaction card portion meets ANSI and ISO transaction card specifications for edge smoothness after being separated from the auxiliary portion without tools.

74. The transaction card assembly of claim 73, wherein the removable element is one of a removable label and a perforated section of the auxiliary member portion.

* * * * *

(12) EX PARTE REEXAMINATION CERTIFICATE (10445th)
United States Patent
Blank (10) Number: US 6,588,658 C1
(45) Certificate Issued: Dec. 19, 2014

(54) TRANSACTION CARD WITH ATTACHED AUXILIARY MEMBER

(75) Inventor: Eric Blank, Boston, MA (US)

(73) Assignee: Abnote USA, Inc., Boston, MA (US)

Reexamination Request:
No. 90/012,438, Aug. 17, 2012

Reexamination Certificate for:
Patent No.: 6,588,658
Issued: Jul. 8, 2003
Appl. No.: 09/602,223
Filed: Jun. 23, 2000

(51) Int. Cl.
*G06K 5/00* (2006.01)
*G06Q 20/34* (2012.01)

(52) U.S. Cl.
CPC ................................. *G06Q 20/342* (2013.01)
USPC ........... 235/380; 235/379; 235/382; 235/383; 235/487

(58) Field of Classification Search
None
See application file for complete search history.

(56) References Cited

To view the complete listing of prior art documents cited during the proceeding for Reexamination Control Number 90/012,438, please refer to the USPTO's public Patent Application Information Retrieval (PAIR) system under the Display References tab.

*Primary Examiner* — Yuzhen Ge (57) ABSTRACT

A transaction card assembly and method for forming a transaction card assembly. The transaction card assembly may include a transaction card and an auxiliary member attached to the transaction card. The transaction card and the auxiliary member may be formed from a same piece of material and may include a machine-readable feature, such as a barcode, magnetic strip or electronic device. The transaction card and/or the auxiliary member may meet ANSI and ISO specifications.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 23-24, 59 and 72 are cancelled.

Claims 1-2, 4, 7-8, 11, 15-16, 18-22, 25-27, 30, 32, 34-38, 43-44, 48-50, 52 and 73 are determined to be patentable as amended.

Claims 3, 5, 6, 9, 10, 12-14, 17, 28-29, 31, 33, 39-42, 45-47, 51, 53-58, 60-71 and 74, dependent on an amended claim, are determined to be patentable.

New claims 75-128 are added and determined to be patentable.

New Claims 75, 83, 111, 114, 117-119 and 134-139 are canceled.

1. A transaction card assembly comprising:
    a transaction card having a long edge and a short edge that is shorter than the long edge, the transaction card configured to meet ANSI and ISO specifications for transaction cards; and
    at least one auxiliary member attached in an edge-to-edge fashion at a long edge of the transaction card;
    wherein the transaction card meets ANSI and ISO specifications for edge roughness when separated from the at least one auxiliary member without the use of a tool;
    *wherein no auxiliary member is attached at a short edge of the transaction card;*
    *wherein the transaction card assembly is in combination with a display device, and*
    *wherein:*
        *the at least one auxiliary member comprises a hole; and*
        *the transaction card assembly is hung on the display device via the hole.*

2. The assembly of claim 1, further comprising a machine readable feature on the transaction card near a side opposite the *at least one* auxiliary member.

4. [The assembly of claim 3] *A transaction card assembly comprising:*
    *a transaction card having a long edge and a short edge that is shorter than the long edge, the transaction card configured to meet ANSI and ISO specifications for transaction cards; and*
    *at least one auxiliary member attached in an edge-to-edge fashion at a long edge of the transaction card;*
    *wherein the transaction card meets ANSI and ISO specifications for edge roughness when separated from the at least one auxiliary member without the use of a tool, and*
    *wherein:*
        *the assembly further comprises a line of weakness between the transaction card and the at least one auxiliary member; and*
        *the transaction card and the at least one auxiliary member are formed from a same sheet of material, and the line of weakness is a scoring of the material between the transaction card and the at least one auxiliary member.*

7. The assembly of claim 6, wherein the portion of the *at least one* auxiliary member includes [a] *the* hole formed through the portion.

8. The assembly of claim 6, wherein the portion of the *at least one* auxiliary member includes an area for applying a handwritten message to the portion.

11. The assembly of claim 1, wherein at least one of the transaction card and the *at least one* auxiliary member includes a machine-readable feature.

15. The assembly of claim 1, wherein at least one of the transaction card and the *at least one* auxiliary member includes a label.

16. The assembly of claim 15, wherein the label includes indicia that corresponds to indicia included on at least one of the transaction card and the *at least one* auxiliary member.

18. The assembly of claim 15, wherein the label obscures information on one of the transaction card and the *at least one* auxiliary member.

19. The assembly of claim 18, wherein the label obscures a PIN number for a prepaid telephone account on one of the transaction card and the *at least one* auxiliary member.

20. The assembly of claim 1, wherein the transaction card includes a magnetic strip that is encoded while the *at least one* auxiliary member is attached to the transaction card.

21. The assembly of claim 20, wherein at least one of the transaction card and the *at least one* auxiliary member includes a label that is adhered and printed while the *at least one* auxiliary member is attached to the transaction card.

22. The assembly of claim 20, wherein at least one of the transaction card and the *at least one* auxiliary member include a barcode that is printed while the *at least one* auxiliary member is attached to the transaction card.

25. The assembly of claim [24] *1*, further comprising a machine readable feature positioned near a second long edge of the transaction card opposite the long edge[, wherein the portion of the auxiliary member attached at a short edge of the transaction card is set back from the second long edge].

26. The assembly of claim 1, wherein at least a portion of the *at least one* auxiliary member is formed to function as a transaction card.

27. A transaction card assembly comprising:
    a transaction card having a machine-readable feature, a long edge and a short edge that is shorter than the long edge; and
    at least one auxiliary member attached to the card in an edge-to-edge fashion, the transaction card and the at least one auxiliary member arranged to allow the at least one auxiliary member and the transaction card to be separated without tools, the transaction card meeting ANSI and ISO specifications for edge roughness for a transaction card after being separated from the at least one auxiliary member,
    *wherein the transaction card assembly is in combination with a display device, and*
    *wherein:*
        *the at least one auxiliary member comprises a hole; and*
        *the transaction card assembly is hung on the display device via the hole.*

30. The assembly of claim 27, wherein at least one of the transaction card and the *at least one* auxiliary member includes a removable label.

32. The assembly of claim 31, wherein the label includes indicia that corresponds to indicia printed on at least one of the transaction card and the *at least one* auxiliary member.

34. The assembly of claim 30, wherein the label obscures information on one of the transaction card and the *at least one* auxiliary member.

35. The assembly of claim 34, wherein the label obscures a PIN number for a prepaid telephone account on one of the transaction card and the *at least one* auxiliary member.

36. The assembly of claim 35, wherein the *at least one* auxiliary member includes:
an intermediate portion attached to the long edge of the transaction card in an edge-to-edge fashion; and
at least one of a key tag portion and a coupon portion attached to the intermediate portion.

37. The assembly of claim 36, wherein the *at least one* auxiliary member includes a key tag that has a machine-readable feature that includes information that corresponds to information stored in a machine-readable feature included on the transaction card.

38. The assembly of claim 36, wherein the transaction card and the *at least one* auxiliary member are formed from a same sheet of plastic material, and a line of weakness is formed between the transaction card and the intermediate portion.

43. The assembly of claim 42, wherein the portion of the *at least one* auxiliary member includes [a] *the* hole formed through the portion.

44. The assembly of claim 42, wherein the portion of the *at least one* auxiliary member includes an area for applying a handwritten message to the portion.

48. The assembly of claim 27, wherein the machine readable feature is a magnetic strip that is encoded while the *at least one* auxiliary member is attached to the transaction card.

49. The assembly of claim 48, wherein at least one of the transaction card and the *at least one* auxiliary member includes a label that is adhered and printed while the *at least one* auxiliary member is attached to the transaction card.

50. The assembly of claim 49, wherein at least one of the transaction card and the *at least one* auxiliary member include a barcode that is printed while the *at least one* auxiliary member is attached to the transaction card.

52. A method for forming a transaction card assembly having a transaction card and at least one auxiliary member, comprising:
providing a single sheet of material;
cutting at least a transaction card and an auxiliary member from the sheet of material;
providing a line of weakness between the transaction card and the auxiliary member so that the transaction card meets ANSI and ISO specifications for edge smoothness after being separated without tools from the auxiliary member; and
providing a machine-readable feature on at least one of the transaction card and the auxiliary member,
wherein:
cutting the transaction card and the auxiliary member from the sheet occurs during a stamping process;
providing the line of weakness results from the stamping process; and
the stamping process further comprises cutting a hole in the auxiliary member, the hole being positioned for hanging the transaction card assembly on a display device via the hole.

73. A transaction card assembly comprising:
a transaction card portion including indicia used to associate a transaction with an issue of the transaction card assembly, the indicia on the transaction card portion uniquely identifying the transaction card assembly from other transaction card assemblies in a plurality of transaction card assemblies;
an auxiliary member portion that is attached to *only one edge of* the transaction card portion in an edge-to-edge fashion and includes a keytag portion, the keytag portion and transaction card portion being separable without the use of tools; and
a removable element attached to one of the transaction card portion and the auxiliary member portion, the removable element including indicia that corresponds to the indicia on the transaction card;
wherein the transaction card portion and the auxiliary member portion are not connected to any other transaction card portion that includes indicia different from the indicia on the transaction card portion, and the transaction card portion meets ANSI and ISO transaction card specifications for edge smoothness after being separated from the auxiliary *member* portion without tools.

75. A transaction card assembly comprising:
a transaction card having a long edge and a short edge that is shorter than the long edge, the transaction card configured to meet ANSI and ISO specifications for transaction cards;
and at least one auxiliary member attached in an edge-to-edge fashion at a long edge of the transaction card;
wherein the transaction card meets ANSI and ISO specifications for edge roughness when separated from the at least one auxiliary member without the use of a tool;
wherein no auxiliary member is attached at a short edge of the transaction card;
wherein the transaction card has an approximately rectangular shape;
wherein the at least one auxiliary member includes a portion having an approximately rectangular shape and is approximately the same size as the transaction card;
wherein the portion of the at least one auxiliary member includes an area for applying a handwritten message to the portion;
wherein the transaction card is a gift card; and
wherein the at least one auxiliary member comprises a hole positioned for hanging the transaction card assembly on a display device via the hole.

76. The transaction card assembly of claim 75, wherein the at least one auxiliary member comprises an advertisement portion, a portion for applying a handwritten message, or both.

77. The transaction card assembly of claim 1, wherein after the separation, the transaction card assembly produces only the transaction card and the at least one auxiliary member.

78. The transaction card assembly of claim 10, wherein one or more of the coupon portion, the advertisement portion, and the key tag include a machine-readable feature.

79. The transaction card assembly of claim 78, wherein the machine-readable feature is an electronic chip.

80. The assembly of claim 11, wherein the machine-readable feature is an electronic device.

81. The transaction card assembly of claim 4, wherein the line of weakness supports the transaction card and the at least one auxiliary member in the transaction card assembly.

82. A transaction card assembly comprising:
a transaction card having a machine-readable feature, a long edge and a short edge that is shorter than the long edge;
and at least one auxiliary member attached to the card in an edge-to-edge fashion, the transaction card and the at least one auxiliary member arranged to allow the at least one auxiliary member and the transaction card to be separated without tools, the transaction card meeting ANSI and ISO specifications for edge roughness for a transaction card after being separated from the at least one auxiliary member;

wherein the transaction card has an approximately rectangular shape;

wherein the at least one auxiliary member includes a portion having an approximately rectangular shape and is approximately the same size as the transaction card;

wherein the portion of the at least one auxiliary member includes an area for applying a handwritten message to the portion;

wherein the transaction card is a gift card; and wherein the at least one auxiliary member comprises a hole positioned for hanging the transaction card assembly on a display device via the hole.

83. The transaction card assembly of claim 82, wherein the at least one auxiliary member further comprises an advertisement portion.

84. The transaction card assembly of claim 27, wherein after the separation, the transaction card assembly produces only the transaction card and the at least one auxiliary member.

85. The transaction card assembly of claim 27, wherein the at least one auxiliary member is attached to only one edge of the transaction card.

86. The method of claim 65, wherein the electronic device is attached to the transaction card.

87. The transaction card assembly of claim 73, wherein after the separation, the transaction card assembly produces only the transaction card and the auxiliary member portion.

88. A transaction card assembly consisting essentially of:
a transaction card having a long edge and a short edge that is shorter than the long edge, the transaction card configured to meet ANSI and ISO specifications for transaction cards;
and at least one auxiliary member attached in an edge-to-edge fashion at a long edge of the transaction card;
wherein the transaction card meets ANSI and ISO specifications for edge roughness when separated from the at least one auxiliary member without the use of a tool; and
wherein after the separation, the transaction card assembly produces only the transaction card and the at least one auxiliary member.

89. The assembly of claim 88, wherein the at least one auxiliary member has a long edge, and the long edge of the at least one auxiliary member is attached to the long edge of the transaction card.

90. The assembly of claim 88, wherein the transaction card has a machine readable feature near a side opposite the at least one auxiliary member.

91. The assembly of claim 88, wherein the transaction card and the at least one auxiliary member are separated by a line of weakness.

92. The assembly of claim 91, wherein the transaction card and the at least one auxiliary member are formed from a same sheet of material, and the line of weakness is a scoring of the material between the transaction card and the at least one auxiliary member.

93. The assembly of claim 88, wherein the transaction card has an approximately rectangular shape and the at least one auxiliary member has an approximately rectangular shape.

94. The assembly of claim 93, wherein the at least one auxiliary member includes a portion having an approximately rectangular shape and is approximately the same size as the transaction card.

95. The assembly of claim 94, wherein the portion of the at least one auxiliary member includes a hole formed through the portion.

96. The assembly of claim 94, wherein the portion of the at least one auxiliary member includes an area for applying a handwritten message to the portion.

97. The assembly of claim 96, wherein the transaction card is a gift card.

98. The assembly of claim 88, wherein the at least one auxiliary member includes at least one of a coupon portion, an advertisement portion, and a key tag.

99. The assembly of claim 88, wherein the transaction card includes a machine-readable feature.

100. The assembly of claim 88, wherein the at least one auxiliary member is attached at only one edge of the transaction card.

101. The assembly of claim 100, wherein the machine-readable feature is an electronic device.

102. The assembly of claim 88, wherein the transaction card comprises a label that obscures information on the transaction card.

103. The assembly of claim 88, wherein the label obscures a PIN number for a prepaid telephone account on the transaction card.

104. The assembly of claim 88, wherein no auxiliary member is attached at a short edge of the transaction card.

105. The assembly of claim 88, wherein the at least one auxiliary member includes at least a portion attached at a short edge of the transaction card.

106. The assembly of claim 105, further comprising a machine readable feature positioned near a second long edge of the transaction card opposite the long edge, wherein the portion of the at least one auxiliary member attached at a short edge of the transaction card is set back from the second long edge.

107. The assembly of claim 88, wherein at least a portion of the at least one auxiliary member is formed to function as a transaction card.

108. A transaction card assembly consisting essentially of:
a transaction card having a long edge and a short edge that is shorter than the long edge, the transaction card configured to meet ANSI and ISO specifications for transaction cards;
and at least one auxiliary member attached in an edge-to-edge fashion at a long edge of the transaction card;
wherein the transaction card meets ANSI and ISO specifications for edge roughness when separated from the at least one auxiliary member without the use of a tool,
wherein the at least one auxiliary member comprises a hole positioned for hanging the transaction card assembly on a display device via the hole.

109. The assembly of claim 99, wherein the machine-readable feature is an electronic device.

110. The method of claim 52, wherein the transaction card includes a magnetic strip that is encoded while the auxiliary member is attached to the transaction card.

111. The assembly of claim 38, wherein the at least one auxiliary member is attached to only one edge of the transaction card.

112. A transaction card assembly comprising:
a transaction card having a long edge and a short edge that is shorter than the long edge, the transaction card configured to meet ANSI and ISO specifications for transaction cards; and
at least one auxiliary member attached in an edge-to-edge fashion at a long edge of the transaction card;

wherein the transaction card meets ANSI and ISO specifications for edge roughness when separated from the at least one auxiliary member without the use of a tool,
wherein:
the assembly further comprises a line of weakness between the transaction card and the at least one auxiliary member; and
the transaction card and the at least one auxiliary member are formed from a same sheet of material, and the line of weakness is a scoring of the material between the transaction card and the at least one auxiliary member; and
wherein:
the auxiliary member is shaped to expose portions of the long edge of the transaction card adjacent the short edges of the transaction card; and
the line of weakness extends continuously between the exposed portions.

113. The transaction card assembly of claim 1, wherein the transaction card and the at least one auxiliary member are formed of a plastic sheet material.

114. The transaction card assembly of claim 113, wherein the plastic sheet material has a thickness of 0.030 inches ±10 percent.

115. The transaction card assembly of claim 4, wherein the transaction card and the at least one auxiliary member are formed of a plastic sheet material.

116. The transaction card assembly of claim 115, wherein the plastic sheet material has a thickness of 0.030 inches ±10 percent.

117. The transaction card assembly of claim 27, wherein the transaction card and the at least one auxiliary member are formed of a plastic sheet material.

118. The transaction card assembly of claim 117, wherein the plastic sheet material has a thickness of 0.030 inches ±10 percent.

119. The transaction card assembly of claim 38, wherein the transaction card and the at least one auxiliary member are formed of a plastic sheet material.

120. The transaction card assembly of claim 119, wherein the plastic sheet material has a thickness of 0.030 inches ±10 percent.

121. The method of claim 52, wherein the sheet of material is a plastic sheet material.

122. The method of claim 121, wherein the plastic sheet material has a thickness of 0.030 inches ±10 percent.

123. The transaction card assembly of claim 73, wherein the transaction card and the auxiliary member portion are formed of a plastic sheet material.

124. The transaction card assembly of claim 123, wherein the plastic sheet material has a thickness of 0.030 inches ±10 percent.

125. The transaction card assembly of claim 88, wherein the transaction card and the at least one auxiliary member are formed of a plastic sheet material.

126. The transaction card assembly of claim 125, wherein the plastic sheet material has a thickness of 0.030 inches ±10 percent.

127. A transaction card assembly consisting of:
a transaction card having a machine-readable feature, a long edge and a short edge that is shorter than the long edge; and
at least one auxiliary member attached to the card in an edge-to-edge fashion, the transaction card and the at least one auxiliary member arranged to allow the at least one auxiliary member and the transaction card to be separated without tools, the transaction card meeting ANSI and ISO specifications for edge roughness for a transaction card after being separated from the at least one auxiliary member,
wherein the transaction card and the at least one auxiliary member are formed from a same sheet of material, and a line of weakness is formed between the transaction card and the at least one auxiliary member.

128. The transaction card assembly of claim 127, wherein the same sheet of material is a plastic sheet material.

* * * * *